United States Patent
Hearne

(10) Patent No.: US 7,021,022 B2
(45) Date of Patent: Apr. 4, 2006

(54) ATTACHMENT SYSTEM AND METHOD FOR ATTACHING WALL OR FLOOR SYSTEMS TO RESPECTIVE FLOORS OR WALLS

(75) Inventor: Jesse L. Hearne, Duchesne, UT (US)

(73) Assignees: Richard vonWeller, Bountiful, UT (US); Anne vonWeller, Bountiful, UT (US)

(*) Notice: Subject to any disclaimer, the term of this patent is extended or adjusted under 35 U.S.C. 154(b) by 164 days.

(21) Appl. No.: 10/668,495

(22) Filed: Sep. 22, 2003

(65) Prior Publication Data

US 2005/0097847 A1   May 12, 2005

Related U.S. Application Data

(63) Continuation of application No. 10/076,028, filed on Feb. 13, 2002, now abandoned.

(60) Provisional application No. 60/268,526, filed on Feb. 14, 2001.

(51) Int. Cl.
*E04B 1/38* (2006.01)

(52) U.S. Cl. .................. 52/715; 52/293.3; 52/699; 52/703; 403/232.1; 403/231; 403/403

(58) Field of Classification Search .................. 52/712, 52/715, 293.3, 295, 297, 698, 699, 703; 403/232.1, 403/403, 231
See application file for complete search history.

(56) References Cited

U.S. PATENT DOCUMENTS

| | | | | |
|---|---|---|---|---|
| 2,751,635 A | * | 6/1956 | Donnahue | 52/69 |
| 2,903,879 A | * | 9/1959 | Williams | 52/294 |
| 4,414,785 A | * | 11/1983 | Howell | 52/169.1 |
| 4,633,626 A | * | 1/1987 | Freeman et al. | 52/71 |
| 4,696,132 A | * | 9/1987 | LeBlanc | 52/69 |
| 4,875,314 A | | 10/1989 | Boilen | 52/167 |
| 4,976,075 A | * | 12/1990 | Kaveckis et al. | 52/71 |
| 4,976,085 A | * | 12/1990 | Krueger | 52/715 |
| 5,186,571 A | * | 2/1993 | Hentzschel | 403/231 |
| 5,444,944 A | * | 8/1995 | Roelofsz | 52/64 |
| 5,513,476 A | * | 5/1996 | Jones | 52/713 |
| 5,653,563 A | * | 8/1997 | Ernst et al. | 411/82 |
| 5,678,379 A | * | 10/1997 | Quattrociocchi | 52/712 |
| 6,105,332 A | * | 8/2000 | Boyadjian | 52/698 |
| 6,150,609 A | * | 11/2000 | Baldwin | 174/66 |
| 6,290,214 B1 | * | 9/2001 | DeSouza | 256/69 |
| 6,334,287 B1 | * | 1/2002 | Fick | 52/745.11 |
| 6,364,374 B1 | * | 4/2002 | Noone et al. | 285/424 |
| 6,931,813 B1 | * | 8/2005 | Collie | 52/713 |

OTHER PUBLICATIONS

Wood Construction Connectors, Simpson Strong-Tie Co., Inc. Catalog C-2001 effective Jan. 1, 2001.

(Continued)

*Primary Examiner*—Carl D. Friedman
*Assistant Examiner*—Yvonne M. Horton
(74) *Attorney, Agent, or Firm*—Lynn G. Foster

(57) ABSTRACT

An attachment system and method for coupling a wall and a floor together during and/or after construction, and for facilitating final orientation of the wall and floor, includes first and second members coupled to the respective wall and floor and pivotal about a hinge member. The wall and floor, and thus the first and second members, pivot between an assembly position, and a final position. In the assembly position, the wall or the floor is assembled, and the first and second members are coupled to the respective wall and floor. In the final position, the wall and floor are finally oriented with respect to one another.

29 Claims, 6 Drawing Sheets

OTHER PUBLICATIONS

"Expansion Jack Washer", Anchor Tiedown Systems, Inc. © 1999.

Anchor Tiedown Systems, Inc. catalog, Aug. 1998.

* cited by examiner

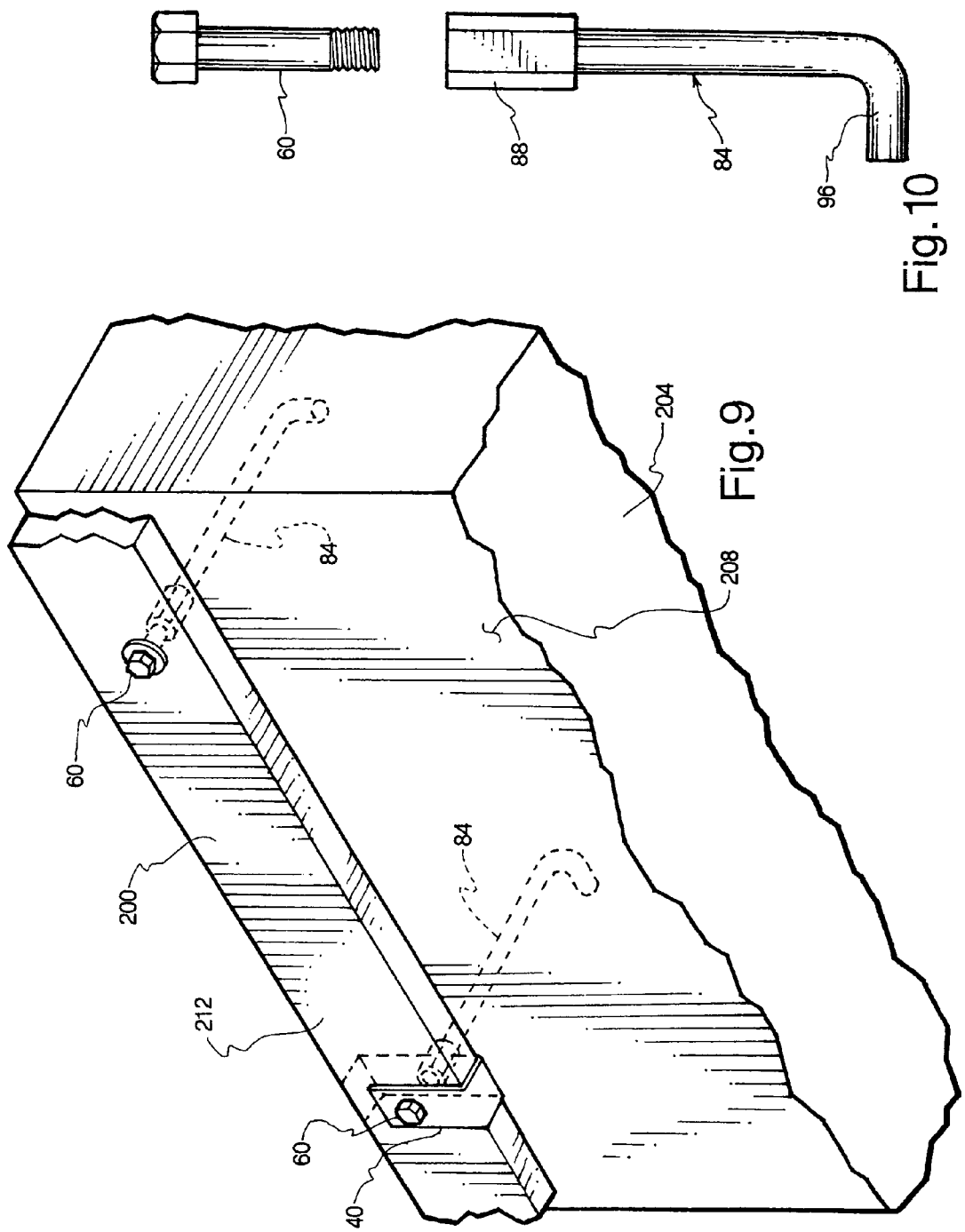

ATTACHMENT SYSTEM AND METHOD FOR ATTACHING WALL OR FLOOR SYSTEMS TO RESPECTIVE FLOORS OR WALLS

This application is a continuation of U.S. patent application Ser. No. 10/076,028, filed 13 Feb. 2002, now abandoned, which claims benefit of 60/268,526 filed Feb. 14, 2001.

BACKGROUND OF THE INVENTION

1. Field of the Invention.

The present invention relates generally to an attachment system and method for attaching either a wall or floor system to a respective floor or wall. More particularly, the present invention relates to an attachment system and method with a strap and/or anchor for pivotally attaching a wall or floor system to a respective floor or wall.

2. Related Art.

During construction or framing, walls are usually constructed on concrete slabs or wooden floors. Typically, such walls, or the framing for such walls, are formed horizontally on the concrete slab or wood floor, and then tipped upward to a vertical orientation. In addition, the walls must be properly positioned and secured to a concrete slab or wood floor. It will be appreciated that such walls may be exceptionally heavy and difficult to maneuver. The weight and movement of such walls raises serious safety issues. Such walls have been known to slip or continue tipping, causing injury to workers and property damage. In addition, such wall panels are typically secured to the concrete slab by bolts that protrude from the concrete. Thus, such wall panels must be lifted and positioned over the bolts. It is sometimes necessary to employ an expensive crane to lift the walls into position over the bolts. In addition, aligning the bolts with holes in the wall is difficult and inaccurate.

Similarly, wooded floor systems are often attached to concrete walls. A perimeter or rim joist is often attached around the concrete wall to support the floor.

SUMMARY OF THE INVENTION

It has been recognized that it would be advantageous to develop a system and method for attaching a wall or floor system to a respective floor or wall that is easier, safer, more secure and/or less expensive. In addition, it has been recognized that it would be advantageous to develop a system and method for attaching a wall system to a floor or foundation, such as a concrete floor or foundation. In addition is has been recognized that it would be advantageous to develop a system and method for attaching a floor system to a concrete wall.

The invention provides an attachment system and method for coupling a wall and a floor together during and/or after construction, and for facilitating final orientation of the wall and floor. The floor can be a wood floor, or a concrete floor or foundation. The system can include first and second members coupled to the respective wall and floor. A hinge member can be coupled between the first and second members so that the first and second members can pivot with respect to one another about the hinge member. The wall and floor, and thus the first and second members, pivot between an assembly position, and a final position. In the assembly position, the wall or the floor is assembled, and the first and second members are coupled to the respective wall and floor. In the final position, the wall and floor are finally oriented with respect to one another.

In accordance with a more detailed aspect of the present invention, the first and second members can be configured so that the wall and an upper surface of the floor are substantially parallel with one another in the assembly position, and so that the wall and the upper surface of the floor are substantially perpendicular with one another in the final position. The first and second members can be substantially parallel with one another in the assembly position.

In accordance with a more detailed aspect of the present invention, the attachment system can include a fastener that extends through both the first and second members in the final position.

In accordance with a more detailed aspect of the present invention, first and second holes can be formed in the respective first and second members. The first and second holes can be positioned to align with one another in the final position. Thus, the fastener can be inserted through the holes.

In accordance with a more detailed aspect of the present invention, the attachment system can include an elongated strap. The strap has opposite sides defining the first and second members. In addition, the strap has a fold portion defining the hinge member, the strap being bendable about the fold portion as the hinge member pivots.

In accordance with a more detailed aspect of the present invention, the attachment system can include a concrete anchor attached to either the first or second member. The concrete anchor can be disposed in concrete forming the wall or the floor before the concrete is cured.

In accordance with a more detailed aspect of the present invention, indicia can be formed on the first or second members. The indicia can be used to properly position the wall or floor with respect to the respective first or second member.

In accordance with a more detailed aspect of the present invention, the hinge member and the first and second members are substantially flat in the assembly position to be substantially flush with the wall or the floor.

In accordance with a more detailed aspect of the present invention, the attachment system can be configured to attach a wall system to a floor with an upper surface. The attachment system can include an elongated strap extending between the wall system and the floor. The strap can have a base portion to be attached flush with the upper surface of the floor, an attachment portion pivotally coupled to the base portion and to be attached to the wall system, and a hinge portion coupled between the base and attachment portions. The hinge portion has a pivot axis about which the attachment portion is pivotal with respect to the base portion. The attachment portion can be pivotal about the pivot axis with respect to the base portion to a pivoted configuration in which the attachment portion is disposed over the base portion to receive a portion of the wall system therebetween. A fastener is insertable through the attachment portion, the base portion, and the portion of the wall system therebetween, to secure the wall system to the floor.

In accordance with a more detailed aspect of the present invention, the base portion can have an attachment hole, and the attachment portion can have an alignment hole. The alignment hole and the attachment hole align in the pivoted configuration, and the fastener is insertable therethrough in the pivoted configuration.

In accordance with a more detailed aspect of the present invention, positioning indicia can be formed on the strap to properly align the strap with the floor. Similarly, alignment indicia can be formed on the strap to align the portion of the wall system on the strap.

In accordance with a more detailed aspect of the present invention, a plurality of fastener holes can be formed in the strap through which fasteners can be inserted to secure the strap to the floor, and to secure the portion of the wall system to the strap.

In accordance with a more detailed aspect of the present invention, the floor is formed of concrete, and the attachment system includes a concrete anchor attached to the strap. The anchor can be received within the concrete of the floor. The anchor can include an anchor bore therein to securely receive the fastener. In addition, the anchor can have an anchor portion extending therefrom to resist removal of the concrete anchor from the floor.

A method for coupling a wall and a floor together includes securing the wall and the floor to the respective first and second members, which in turn are coupled together by the hinge member, while the wall and the floor are in an assembly position in which the wall or the floor are constructed. One of the wall or the floor are pivoted with respect to the other about the hinge member from the assembly position to a final position in which the wall and the floor are in a final oriented with respect to one another.

In accordance with a more detailed aspect of the present invention, a fastener is inserted through portions of the wall and the floor, and through both the first and second members, in the final position.

In accordance with a more detailed aspect of the present invention, first and second holes formed in the respective first and second members are aligned in the final position.

In accordance with a more detailed aspect of the present invention, the wall and the floor can be attached to opposite sides of the strap. The strap can bend about the fold portion as the wall or floor pivots.

In accordance with a more detailed aspect of the present invention, the concrete anchor can be disposed into concrete forming the wall or the floor before the concrete is cured.

In accordance with a more detailed aspect of the present invention, the wall or the floor can be positioned with indicia formed on the first or second members to properly position the wall or the floor with respect to the respective first or second member.

In accordance with a more detailed aspect of the present invention, a bore can be formed in the wall or the floor using a hole in the first or second member as a guide.

In accordance with a more detailed aspect of the present invention, a wall system can be attached to a floor with an upper surface. A strap is secured on the upper surface of the floor. A portion of the wall system is secured to the strap while the wall system is in a horizontal orientation. The wall system is pivoted with respect to the floor from the horizontal orientation to a vertical orientation, with the strap acting as a hinge about which the wall system pivots, and with the strap maintaining the portion of the wall system secured to the floor.

In accordance with a more detailed aspect of the present invention, the strap can be positioned on the floor using a positioning indicia on the strap.

In accordance with a more detailed aspect of the present invention, the floor is a wood floor; and the strap can be secured on the upper surface of the wood floor by driving fasteners through the strap and into the wood floor.

In accordance with a more detailed aspect of the present invention, the floor is a concrete floor; and the strap can be secured on the upper surface of the concrete floor by disposing a concrete anchor attached to the strap in concrete forming the concrete floor before the concrete cures.

In accordance with a more detailed aspect of the present invention, a fastener can be inserted through the strap and into an anchor bore of the concrete anchor after the wall has been pivoted to the vertical orientation to secure the portion of the wall system to the concrete floor.

In accordance with a more detailed aspect of the present invention, the portion of the wall system can be aligned with alignment indicia on the strap. The attachment portion of the strap can be folded to abut to the portion of the wall system. The attachment portion of the strap can be secured to the portion of the wall system.

In accordance with a more detailed aspect of the present invention, a bore is formed through the portion of the floor system using an alignment hole in the attachment portion of the strap to form the bore in a proper location.

In accordance with a more detailed aspect of the present invention, the hinge portion of the strap can be folded about a fold axis of the strap so that the bore of the portion of the floor system aligns with an attachment hole in the strap, and so that the portion of the floor system is disposed between the attachment portion of the strap and a base portion of the strap. The fastener can be inserted through the alignment hole in the strap, the bore in the portion of the wall system, and the attachment hole in the strap to secure the portion of the wall system to the floor.

The attachment system can be a sub-surface attachment system, and can a concrete anchor to be substantially entirely disposed in concrete forming the wall or the floor before the concrete is cured. The anchor includes an anchor bore having an opening thereto to be located substantially flush with an outer surface of the wall or the floor, and having a longitudinal axis. An anchor portion has at least a portion extending laterally with respect to the longitudinal axis to anchor in the concrete and resist removal of the concrete anchor. A fastener is insertable into the anchor bore of the concrete anchor, and has a head to secure at least a portion of the wall or the floor between the head and the concrete anchor.

A method for coupling a wall and a floor together with the subsurface attachment system include disposing a concrete anchor in concrete forming the wall or the floor before the concrete is secured. A portion of the wall or the floor is placed against the concrete anchor. The fastener is inserted through the wall or the floor against the concrete anchor, and into an anchor bore of the concrete anchor.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 9 is an exploded perspective view of preferred embodiments of attachment systems in accordance with the present invention attaching a floor system to a wall; and FIG. 10 is a partial perspective view of the attachment systems of FIG. 9 attaching the floor system to the wall.

DETAILED DESCRIPTION

Figure 1:
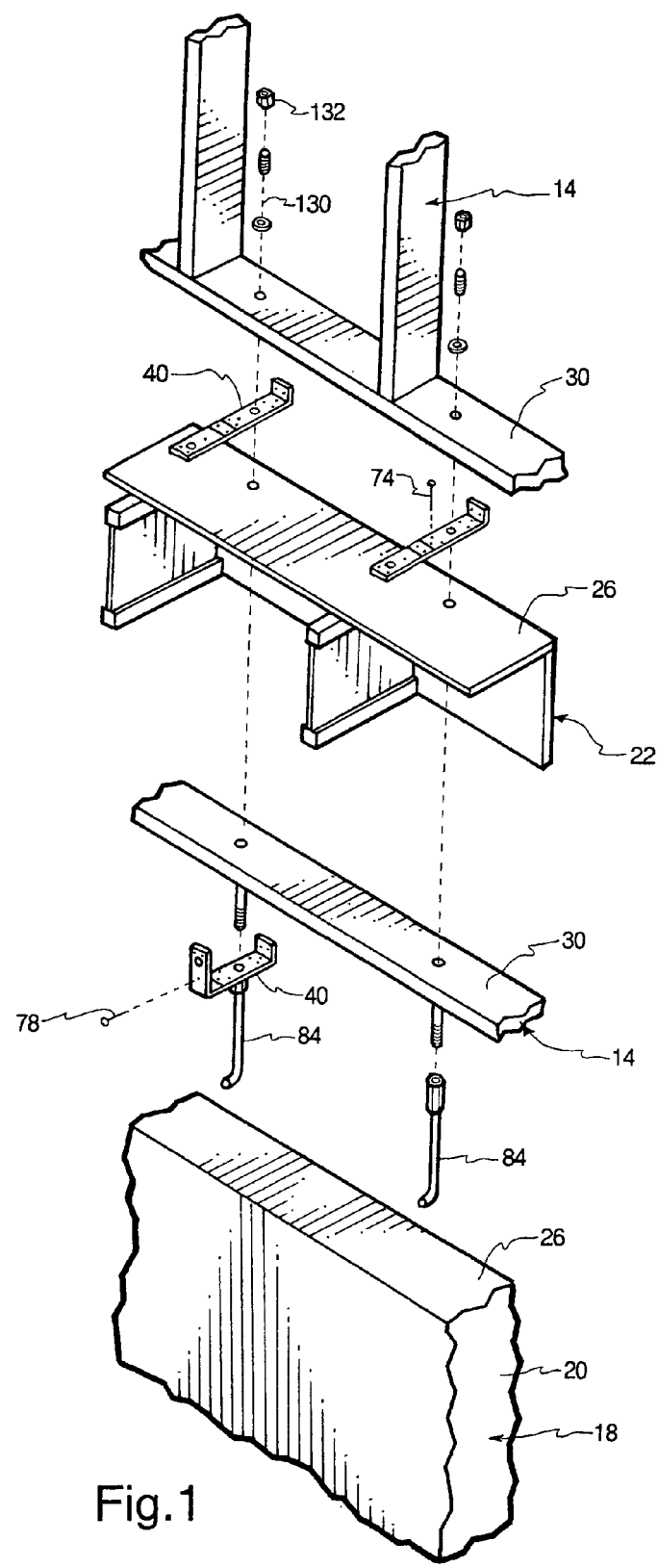
FIG. 1 is an exploded perspective view of preferred embodiments of attachment systems in accordance with the present invention attaching wall systems to floors or foundations.

For purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The present invention involves an attachment system and method for attaching a wall and a floor together, such as during construction. For example, the attachment system and method can be used to attach either 1) a wall system to a floor or foundation, or 2) a floor system to a wall. Construction and building are examples of fields that may benefit from the use of such a system and method. The attachment system and method of the present invention advantageously 1) secures either the wall or floor system to the respective floor or wall both during and after construction for safety and ease, and/or 2) remains initially flush with the floor or wall to ease construction and prevent damage.

Figure 2:
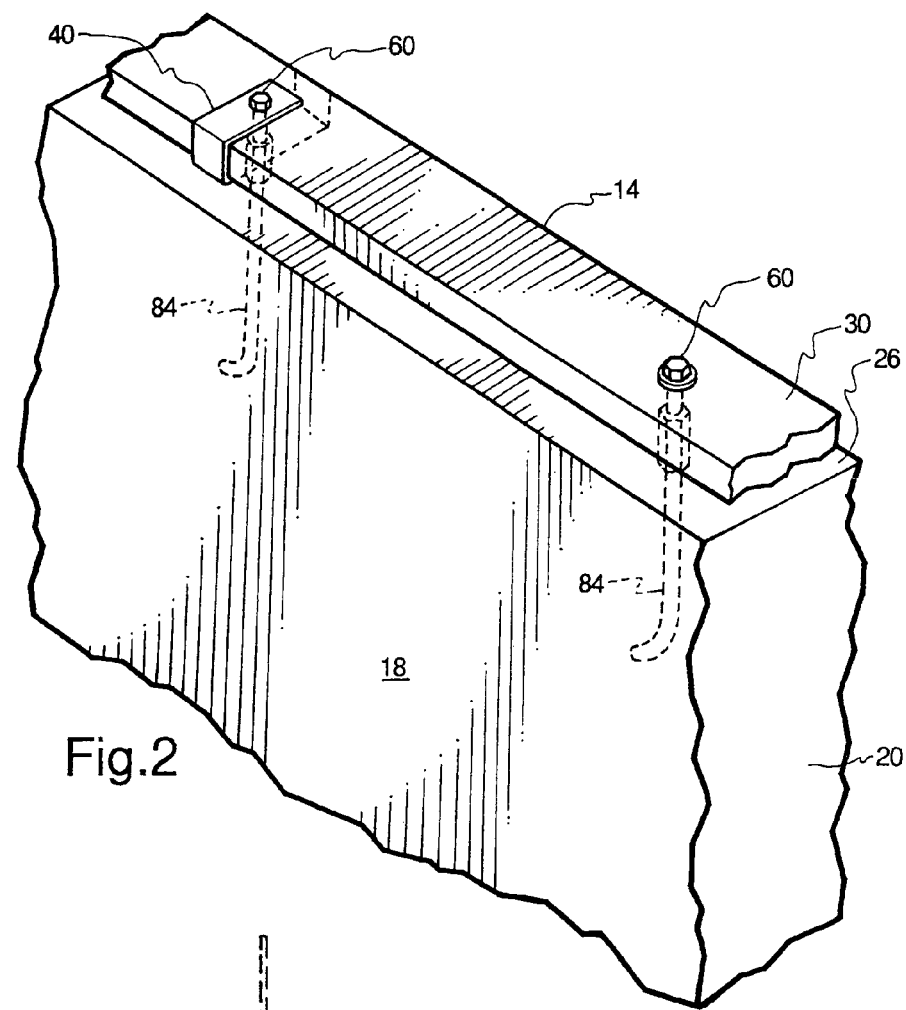
FIG. 2 is a partial perspective view of the attachment systems of FIG. 1 attaching the wall systems to the floors or foundations.

As illustrated in FIGS. 1 and 2, a system in accordance with the present invention is shown for attaching a wall or wall system 14 to a floor 18. The term "floor" is used broadly herein to refer to a base or support surface, such as a concrete floor or slab, a concrete foundation wall, a wood floor, etc. Thus, the floor 18 can be a concrete floor or foundation 20, such as a horizontal concrete slab, or a vertical concrete wall or column that will support the wall system 14. In addition, the floor 18 can be a wood floor 22, such as on a second level of building. It is of course understood that the concrete or wood floors are merely illustrative of common materials currently used, and that the floor can be formed of any material, including masonry, brick, laminates, engineered building materials, etc. The floor 18 has an upper surface 26 upon which the wall system 14 is supported or disposed.

The wall system 14 can include a lower portion with a baseboard or sill plate 30. The sill plate 30 can be horizontally oriented, and disposed on the surface 26 of the floor 18 or 22. Other portions of the wall system 14, such as vertical supports (2×4s or 2×6s), can be attached to the sill plate 30. Still other portions of the wall system 14, such as plywood, etc., can be fastened to the sill plate 30 and/or the vertical supports.

As stated above, such wall systems are commonly constructed in a horizontal orientation, such as on the upper surface 26 of the floor 18 or 22, tilted upwardly to a vertical orientation, located and positioned as needed, and secured to the floor. It will be appreciated that such wall systems can be heavy and difficult to handle. In addition, such wall systems are commonly attached to the floor or foundation 18 with bolts that protrude from the surface 26 and extend through holes in the sill plate 30. It will be appreciated that aligning the holes in the sill plate 30 with the bolts extending from the floor or foundation 18 can be difficult. Furthermore, it will be appreciated that it can be necessary to lift the wall system 14 over the protruding bolts in order to position the wall system with the bolts extending through the holes therein. While smaller wall systems may be lifted, aligned and secured manually with some degree of difficulty and effort, larger wall systems may require expensive equipment, such as cranes, to be lifted and aligned. Due to the weight and size of the wall systems, tilting and lifting the wall system can be awkward and dangerous. For example, the lower end or sill plate of the wall system may slip outwardly while the wall system is being tilted upwardly, causing the wall system to fall or strike workers, equipment or other objects. In addition, such wall systems might fall one or more stories.

Referring to FIGS. 1–4, in accordance with one aspect of the present invention, the attachment system and method of the present invention advantageously includes first and second members 32 and 34 coupling together the wall and floor 14 and 18 both during and after construction, and for facilitating final orientation of the wall and floor 14 and 18. The first member 32 can be coupled to the wall 14, while the second member 34 can be coupled to the floor 18 (or vise versa as described below). A hinge member 36 is coupled between the first and second members 32 and 34, and defines a pivot axis 38 about which the first and second members 32 and 34, and thus the wall and the floor 14 and 18, can pivot with respect to one another. The first and second members 32 and 34, and thus the wall and the floor 14 and 18 are pivotal with respect to one another about the hinge member 36 or pivot axis 38. Therefore, the wall and floor 14 and 18 are coupled together by the attachment system, or first, second and hinge members 32, 34 and 36.

Figure 6:
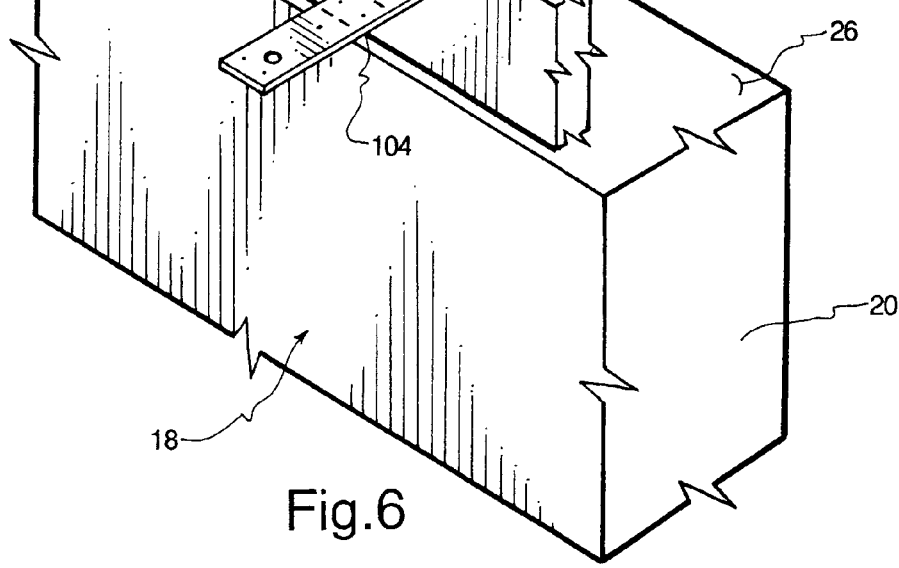
Figure 7:
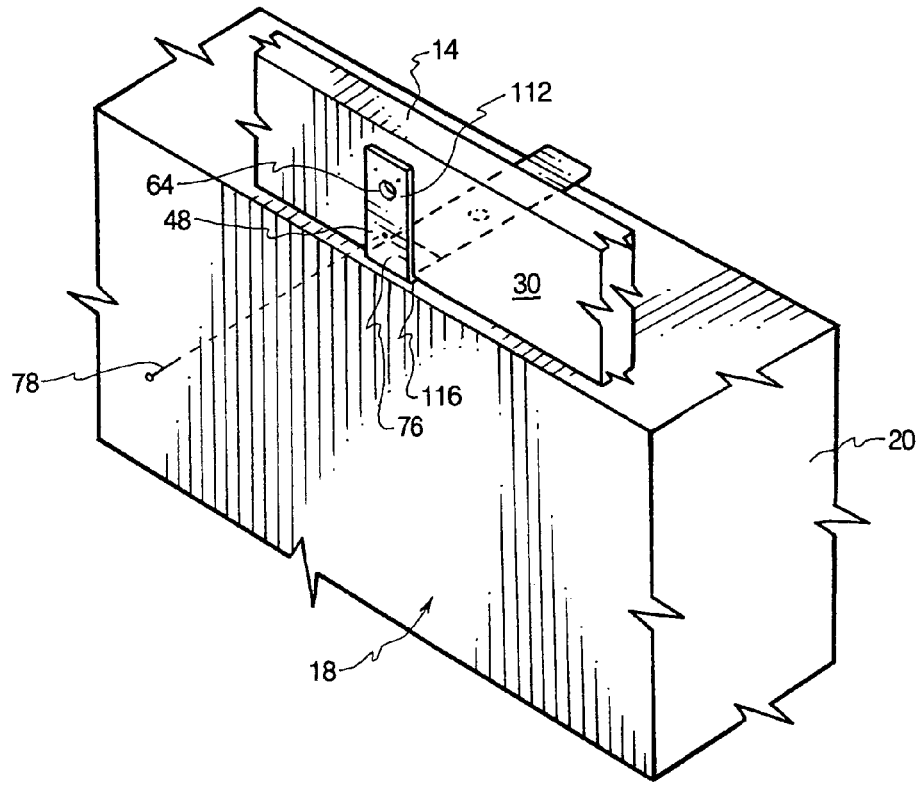
Figure 8:
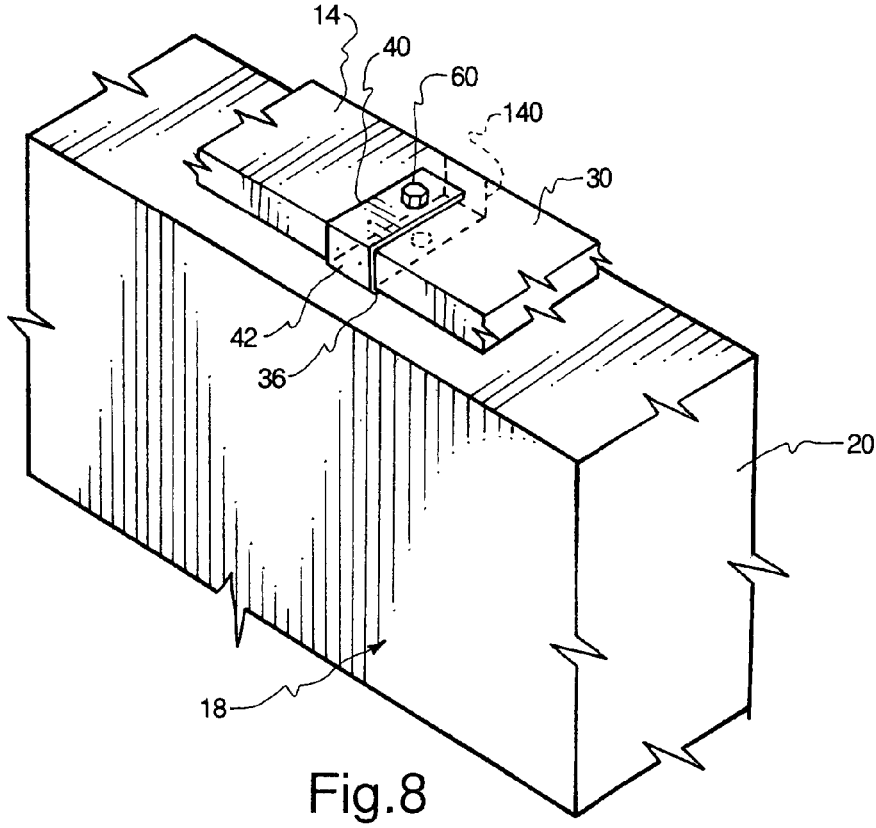

In addition, the first and second members 32 and 34, and thus the wall and floor 14 and 18, pivot between assembly and final positions. In the assembly position, the wall 14 is assembled, and the wall and floor 14 and 18 are coupled to the respective first and second members 32 and 34, as discussed in greater detail below. Thus, the wall 14 may be horizontally oriented as it is assembled, and substantially parallel with the upper surface 26 of the floor 18, as shown in FIGS. 6 and 7. In the assembly position, the first and second members 32 and 34 can be substantially parallel with one another, and substantially flat. Thus, the first and second member 32 and 34 have a low profile that resists interference with, and damage to, themselves or other objects, such as construction equipment or workers. In the final position, the wall and floor 14 and 18 are finally oriented with respect to one another. Thus, the wall 14 and upper surface 26 of the floor 18 can be perpendicular to one another, as shown in FIG. 8.

In accordance with another aspect of the present invention, the attachment system and method of the present invention advantageously can include a strap 40 for securing or attaching the wall and floor 14 or 18 both during and after construction, and for facilitating raising and positioning the wall system 14. The strap 40 has opposite sides defining the first and second members 32 and 34, and has a fold portion or hinge section 42 defining the hinge member 36. The strap 40 can be secured or attached to the upper surface 26 of the floor 18, as discussed in greater detail below, with a lower surface thereof abutting to, or be disposed on, the upper surface 26. In addition, the strap 40 can be elongated, and initially can be substantially flat and substantially flush with the upper surface 26. Thus, the strap 40 has a low profile and resists being snagged and damaged during construction.

The strap 40 can include a plurality of different portions or sections, including a base section 44 and an attachment section 48. The base section 44 can remain flat and flush with the upper surface 26 of the floor 18. The attachment section 48 can be attached to a portion of the wall system 14, such as the sill plate 30, and can be pivotal with respect to the base section 44. The fold portion or hinge section 52 has a pivot axis 38 about which the attachment section 48 can pivot with respect to the base section 44.

The strap 40 can be formed from an elongated strip of sheet metal that can be cut or stamped to form the desired shape and features. The sheet metal can be galvanized to resist rusting. It is of course understood that the strap 40, or first and second members 32 and 34, can be formed from other materials, such as plastic, reinforced plastic, fiber/resin composite, etc. Perforations, or a plurality of aperatures, can be formed in the strap 40 along the axis 38 to create the fold portion or hinge section 52. The perforations reduce the amount of material at the fold portion or hinge section 52 which tends to cause the strap 40 to bend along the perforations. Thus, the perforations can create a living hinge in the strap.

Figure 5:
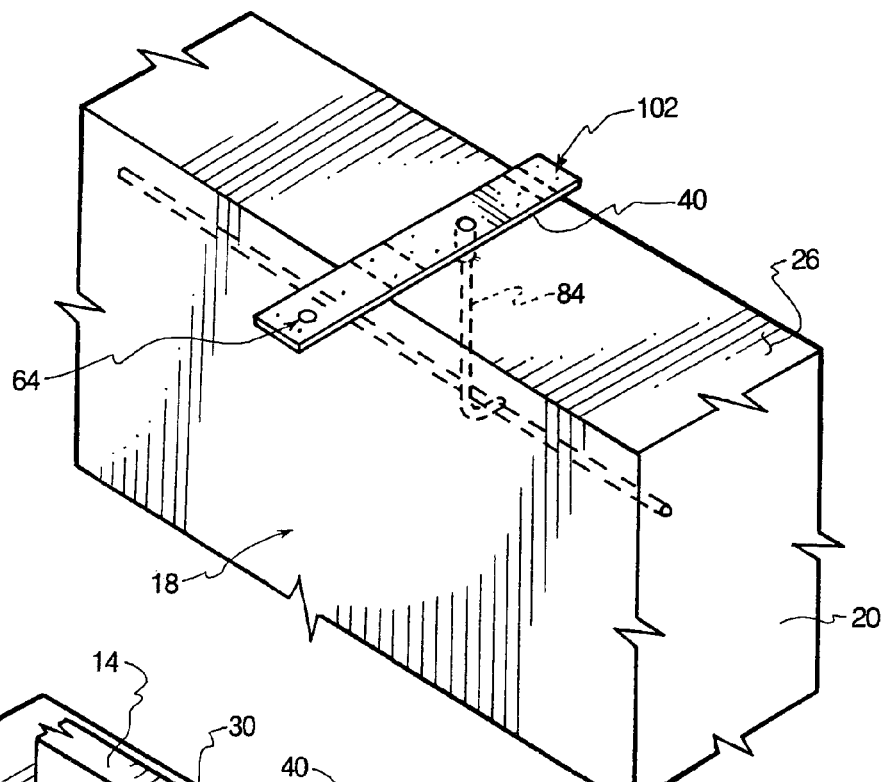
FIGS. 5–8 are schematic views of a method for attaching a wall system to a floor or foundation in accordance with the present invention using the attachment system of FIGS. 1–4.

As stated above, the first and second members 32 and 34, or the strap 40, pivots between an assembly position and a final position. The first and second members 32 and 34, or the base and attachment portions 44 and 48 of the strap 40 can have an initial configuration and a pivoted configuration. In the initial configuration, the first and second members 32 and 34, or base and attachment portions 44 and 48, can be substantially straight, flat, and parallel with one another, and can be positioned flush with the upper surface 26 of the floor 18, as shown in FIG. 5. In the pivoted configuration, the first member 32 can pivot with respect to the second member 34, or the attachment portion 48 can pivot with respect to the base section 44. In addition, in the pivoted configuration, the first member 32 can be disposed over the second member 34, or the attachment portion 48 can be disposed over the base portion 44, with the baseboard or sill plate 30 disposed therebetween.

The attachment system also includes a fastener 60 extending through the first and second members 32 and 34 in the final position, or through the base and attachment portions 44 and 48 in the pivoted configuration, to secure the wall 14 or sill plate 30 to the floor 18. Thus, the fastener 60 also extends through the sill plate 30 and into the floor 18. The first member 32, or attachment portion 48, can have a first alignment hole 64 formed therein to receive the fastener 60 therethrough. Similarly, the second member 34 or base portion 44 can have a second attachment hole 68 formed therein to receive the fastener 60 therethrough. The first and second, or alignment and attachment, holes 64 and 68 can be positioned on the strap 40 to align in the final position or pivoted configuration so that the fastener 60 can extend therethrough.

As stated above, the attachment system can be used with various types of floors or foundations, or floors or foundations formed from various different types of material, such as a concrete floor or foundation 20, or a wood floor 22. The strap 40 can have a plurality of apertures of holes formed therein to receive fasteners therethrough to secure the strap 40 to the wall system 14, and/or floor 20 or 22. For example, a plurality of apertures 72 can be formed in the base portion 44, or second member 34, through which fasteners 74 are driven to secure the strap 40 to the floor, such as wood floor 22. The fasteners 74 can be nails or screws. Similarly, a plurality of apertures 76 can be formed in the attachment section 48, or first member 32, through which fasteners 78, such as nails or screws, can be driven to secure the strap 40 to the wall 14, or sill plate 30.

Furthermore, claws or spikes 80 can be formed in the strap 40 itself for securing the strap 40 to the floor 22. The claws 80 can be formed by cutting or stamping a portion of the strap 40, and bending the portion outwardly from the strap. For example, a triangular claw 80 can be formed by cutting or stamping two sides of the triangle, and bending the claw about the third side. The strap 40 can be attached to the floor 22 by driving the claws 80 into the floor 22. Similar claws or spikes can be formed in the strap to attach the strap to the wall.

In addition, the attachment system can include a concrete anchor 84 to secure to concrete, such as the concrete floor or foundation 20. The concrete anchor 84 can be attached to the second member 24, or base portion 44 of the strap 40. The concrete anchor 84 can be inserted into the concrete of the floor 20 before the concrete cures, as discussed below.

A receiving bore can be associated with the strap 40 for receiving the fastener 60. For example, the anchor 84 can include an anchor bore 88 with an opening 92 thereto. The opening 92 of the anchor bore 88 can be aligned with the second or attachment hole 68 of the second member 34 or base portion 44. Thus, the fastener 60 can extend through the attachment hole 68 and opening 92, and into the anchor bore 88, so that the fastener 60 is securely received within the anchor bore 88. The fastener 60 can be a screw or bolt with screw threads formed thereon, while the anchor bore 88 can be a nut or the like with screw threads formed therein, so that the screw threads of the fastener 60 and anchor bore 88 match and mate with one another. Thus, the fastener 60 can be rotated with respect to the anchor bore 88 to engage the screw threads. It is of course understood that the fastener 60 and receiving bore can have other configurations, such as mating, unidirectional teeth, etc.

The anchor 84 also can include an anchor portion 96 to secure the anchor 84 in the concrete. The anchor portion 96 can include a portion extending laterally with respect to a longitudinal axis of the anchor bore 88 to resist removal or withdrawal of the anchor 84 from the concrete. The anchor 84 or anchor portion 96 can be elongated to extend to a required depth in the concrete, such as eight to twelve inches, and can have a "J" or "L" shape to resist removal.

As stated above, the anchor bore 88 can include a nut or the like attached to the strap 40. The nut can have a flange extending longitudinally on one end to be received within the attachment hole 68 of the strap 40 and expanded to secure the nut to the strap. The anchor portion 96 can include a "J"-bolt with threads on one end to secure to the nut. It is of course understood that this is only one example of forming the attachment system, and that the anchor can be integrally formed an attached to the strap in another fashion. In addition, it is understood that the anchor portion 96 can have other configurations, such as a plurality of protrusions or lateral contours to resist removal.

Indicia also can be formed on the strap 40 to aid in properly aligning the strap 40 with the floor 20 or 22, and/or wall 14. The indicia can be formed in the strap 40 by perforating or scoring the strap. Thus, the indicia can be perforations or scored lines. It is of course understood that the indicia can be printed or otherwise formed on the strap. The indicia can include positioning indicia 102 formed on the base portion 44, or second member 34, to properly align the strap with the floor 20 or 22. For example, the positioning indicia 102 can be positioned on an edge of the floor or foundation 20 or 22. The positioning indicia 102 can be spaced from the attachment hole 68 a predetermined distance so that the attachment hole 68 is properly positioned.

In addition, the indicia can include alignment indicia 104 formed on the attachment portion 48, or first member 32, to properly align the wall 14 or sill plate 30 with the strap 40, as discussed in greater detail below. The alignment indicia 104 can include a pair of indicia between which the sill plate 30 can be disposed, such as in a vertical orientation during construction.

The attachment portion 48, or first member 32, can have an initial flat orientation to prevent interference (as described above), and a subsequent contoured configuration to attach to the wall 14 or sill plate 30. The attachment portion 48 can include one or more segments, such as the first and second segments 112 and 114, to facilitate attaching the strap 40 or attachment portion 48 to the wall 14 or sill plate 30. A second hinge or second bend portion 116 can be formed between the first and second segments 112 and 114 so that they can pivot with respect to one another. The second hinge or bend portion 116 can be similar to that described above. In addition, the second hinge or bend portion 116 can be formed by perforations. The second hinge or bend portion 116, or perforations thereof, can also form the alignment indicia 104 as described above.

The first segment 112 can bend about the second hinge or bend portion 116 with respect to the second segment 114. Thus, referring to FIG. 6, the wall 14 or sill plate 30 can be disposed on the attachment portion 48, or first member 32, by placing the sill plate 30 on its side, or vertically oriented, on the second segment 114 of the attachment portion 48, using the alignment indicia 104 to properly orient the sill plate 30. Referring to FIG. 7, the first segment 112 of the attachment portion 48 can be pivoted or folded about the second hinge portion 116 to abut to the sill plate 30, so that the first segment 112 is vertically oriented along the sill plate 30. Such a configuration facilitates attachment of the wall 14 or sill plate 30 to the strap 40 because the fasteners 78 can now be inserted through the apertures 76 in the attachment portion 48 and into the sill plate 30.

Figure 3:
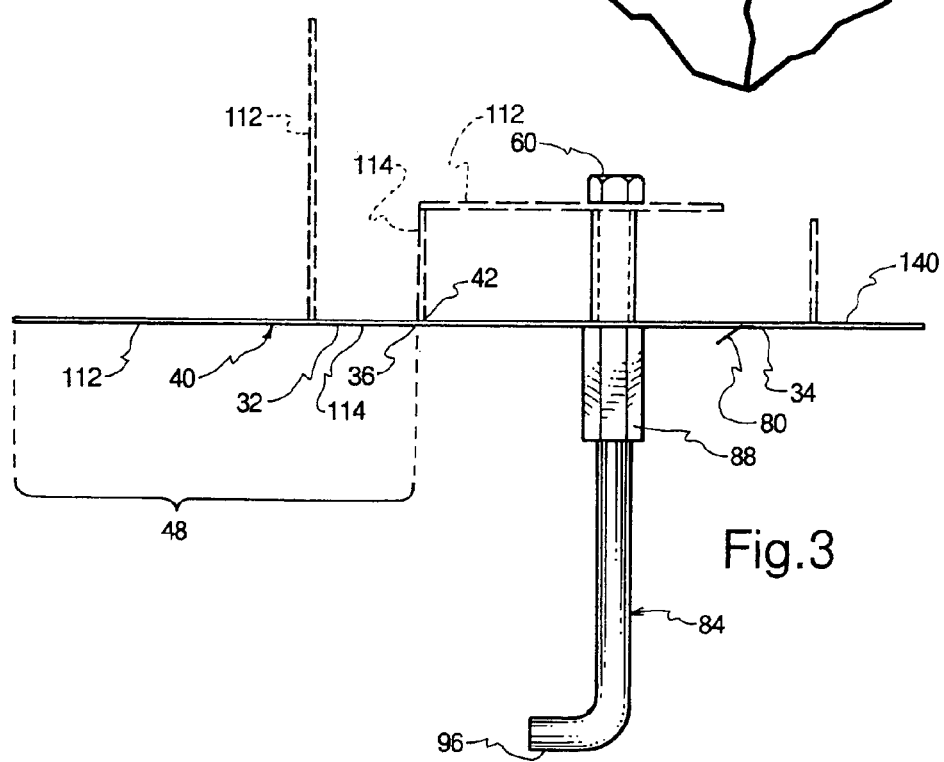
FIG. 3 is a side view of a preferred embodiment of an attachment system of FIGS. 1 and 2.
Figure 4:
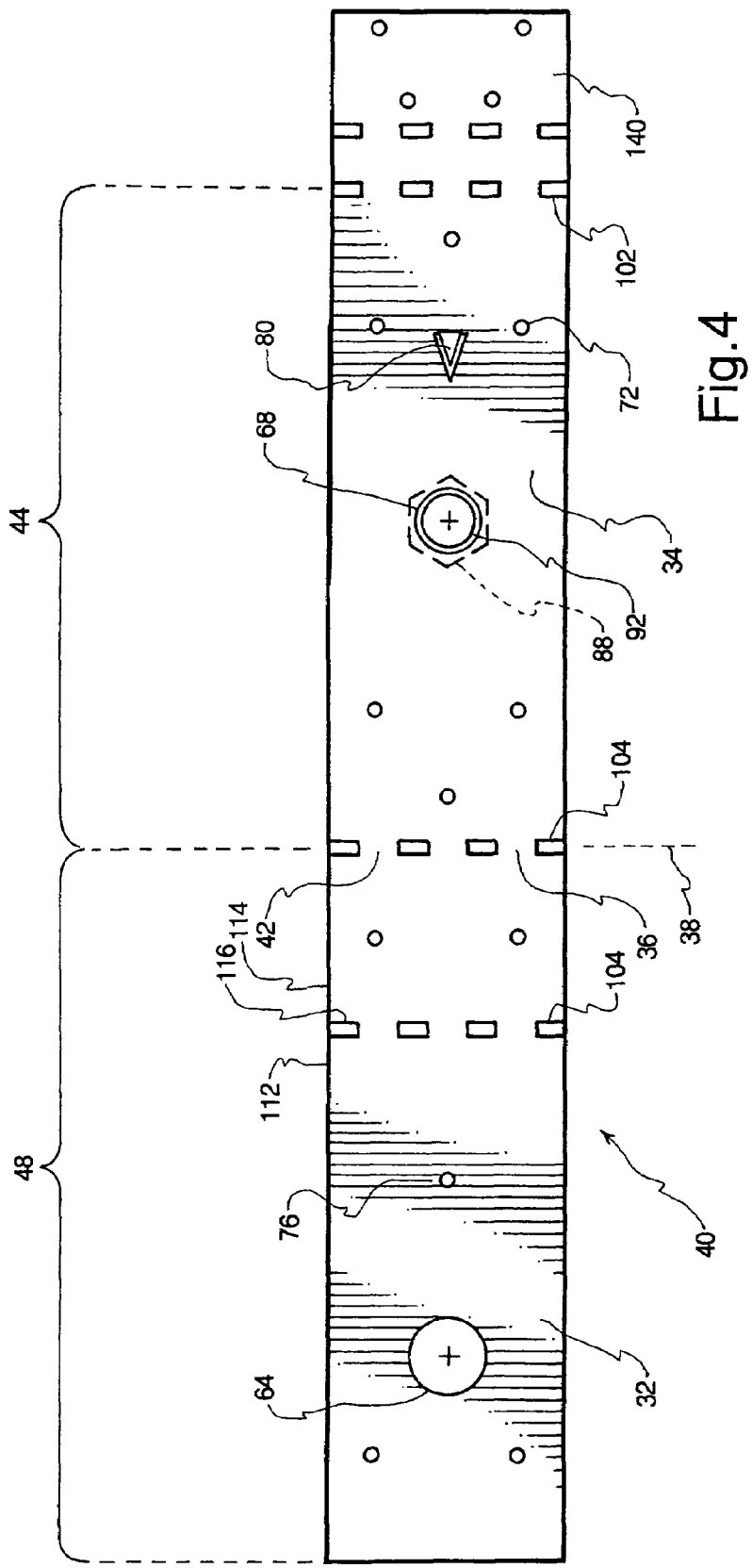
FIG. 4 is a top view of the attachment system of FIG. 3.

In addition, the attachment portion 48 advantageously can form a drill jig to facilitate forming a bore through the sill plate 30 to later receive the fastener 60 (FIG. 3). As described above, one difficult with traditional wall construction is accurately locating the bores in the sill plate with the bolts protruding from the floor or foundation. The alignment hole 64 advantageously can be used to position a drill bit for drilling a bore through the sill plate 30. Because the alignment hole 64 in the attachment portion 48 will align with the attachment hole 68 (FIG. 4) in the base portion 44 (FIG. 4), the bore in the sill plate 30 also will be aligned, as described below.

Referring to FIGS. 5–8, a method for using the above described attachment system for coupling a wall 14 and floor 20 or 22 together includes securing the wall 14 and the floor 20 or 22 to the respective first and second members 32 and 34, or to the respective attachment portion 48 and base portion 44 of the strap 40, while the wall 14 or floor 20 or 22 are in the assembly position. The wall 14 or the floor 20 or 22 are constructed in the assembly position. For example, the wall 14 can be constructed in a horizontal orientation, or laying down, and generally parallel with the upper surface 26 of the floor or foundation 20 or 22.

Referring to FIG. 5, the second member 34, or base portion 44 of the strap 40, can be secured to the floor 20 by inserting the concrete anchor 84 into the concrete forming the floor or foundation 20 before the concrete cures. The anchor portion 96 (FIG. 3) can engage rebar or other structure in the concrete. Referring to FIG. 1, fasteners 74 can be driven through the apertures 72 (FIG. 4) and into the wood floor 22. Similarly, the claws 80 (FIG. 4) formed in the strap 40 also can be driven into the wood floor 22. It is of course understood that these are examples of various ways of attaching the strap 40 or second member 34 to the floor 20 or 22.

Referring again to FIGS. 1 and 5, the attachment system or strap 40 can be properly located on the floor 20 or 22 using the positioning indicia 102. For example, the positioning indicia 102 of the strap can be aligned with an edge of the floor 20 or 22. As indicated above, the positioning indicia 102 can be spaced a predetermined distance from the attachment hole 68 or the anchor 84 so that the strap 40 and anchor 84 are properly positioned. Such a distance of the anchor 84 may be specified by building codes or a building engineer. As another example, the positioning indicia 102 can be aligned with a chalk or snap line.

Referring to FIG. 6, the attachment system or strap 40 can be properly located with the wall 14. For example, the sill plate 30 of the floor 14 can be vertically oriented and aligned with the alignment indicia 104, or between the pair of alignment indicia. It will be appreciated that wall systems 14 are often constructed in a horizontal orientation (with the sill plate 30 in a vertical orientation) prior to being vertically oriented and positioned on the floor or foundation.

Referring to FIG. 7, the first segment 112 of the attachment portion 48 can be pivoted or folded about the second hinge portion 116 (FIG. 4) to abut to the sill plate 30, so that the first segment 112 is vertically oriented along the sill plate 30. The fasteners 78 can now be inserted through the apertures 76 in the attachment portion 48 and into the sill plate 30. As stated above, such fasteners can be, for example, nails or screws.

It will be noted that the wall 14 and the floor 18 are now secured together by the attachment system or strap 40 while the wall 14 is in an assembly position. In the assembly position, the wall 14 can be constructed, as is known in the art, and can be horizontally oriented prior to being raised. In addition, a bore can be formed through the sill plate 30 of the wall 14. As stated above, the alignment hole 64 in the first member 32 or attachment portion 48 can be used as a guide for drilling the bore. Thus, the alignment hole 64 advantageously properly positions the bore so that it is properly aligned when the wall is raised.

Referring to FIG. 8, with the wall 12 and floor 18 secured together, the wall 14 advantageously can be pivoted about the hinge member 36 and pivot axis 38, or about the fold portion or hinge section 42 of the strap 40, to a final position in which the wall 14 and floor 18 are in a final orientation with respect to one another. In the final position or orientation, the wall 14 is vertical and perpendicular to the upper surface 26 of the floor 18. As the wall 14 is pivoted or raised, the fold portion or hinge section 42 of the strap 40 can bend. The strap 40 advantageously keeps the wall 14 secured to the floor 18 to prevent the bottom of the wall 40 from slipping. In addition, the strap 40 advantageously properly positions the wall 14 with respect to the floor 18.

In the final position, the fastener 60 can be inserted through the first and second members 32 and 34, or base and attachment sections 44 and 48, and through the sill plate 30 and into the floor 18. As indicated above, the first and second apertures, or the attachment and alignment apertures 68 and 64, are positioned on the strap 40 so that they align in the final position to receive the fastener therethrough. In addition, the fastener 60 can extend into the anchor bore 88 of the anchor 84. As stated above, the fastener 60 can be a bolt that has a head that abuts to the attachment portion 48 of the strap 40, and that has male screw threads that mate with female screw threads in the anchor bore 88. Thus, the attachment portion 48 of the strap 40 acts as a washer for the head of the bolt or fastener 60.

Alternatively, referring to FIG. 1, the fastener 60 can be a rod or bar 130 that extends through the floor 22. Thus, the rod or bar 130 can extend through one or more floors 18. For example, the rod or bar 130 can have a lower end with threads thereon that couple with the anchor bore 88 of the anchor 84 of a concrete floor 20 of a first level. The rod or bar 130 can extend through the wall 14 and the wood floor 22 of a second level. Nuts 132 can engage the rod or bar 130 and can be disposed above and below the wood floor 22.

Referring again to FIGS. 3 and 4, the strap 40 also can include a tab 140 opposite the attachment portion 48, and that bends or pivots to abut to an opposite side of the sill plate 30. As shown in FIG. 8, after the wall 14 has been pivoted to the final position, the tab 140 can be bent towards the sill plate 30 and fasteners 78 can be secured therethrough. Thus, the tab 140 provides additional attachment of the strap 40 to the wall 14 or sill plate 30.

While the attachment system and method for coupling a wall and floor together in accordance with the present invention have been described above with specific reference to coupling a wall 14 to a floor 18, or erecting a wall on a floor or foundation, the attachment system and method also can be used to secure a floor to a wall. Referring to FIG. 9, the attachment system and method in accordance with the present invention is shown coupling a floor or floor system 200 to a wall or wall system 204. The floor 200 can be a wood floor, while the wall 204 can be a concrete wall.

The attachment system and method are substantially the same as described above. The strap 40 can be secured to an outer surface 208 of the wall 204 using fasteners such as nails or screws driven into the wall, or using the anchor 84 disposed in the concrete of the wall 204 before the concrete cures. Because the strap 40 is substantially flat, it may be disposed against a surface of concrete formed used to form the concrete wall 204. Thus, when the concrete forms are removed, the strap 40 will be disposed at the surface 208 of the wall 204.

In the case of coupling the floor 200 to the wall 204, the wall 204 is vertically oriented, and the floor 200 can be assembled and/or attached to the strap 40 in a vertical orientation, defining the assembly position. The floor 200 can be pivoted to a horizontal orientation, substantially perpendicular to the wall 204, defining the final position. The strap 40 thus forms a saddle for receiving a portion of the floor 200, such as a rim joist 212.

Referring to FIGS. 1 and 10, the anchor 84 can be used without the strap for a sub-surface attachment system. The anchor 84 can be substantially the same as described above, and can include an anchor bore 88 with an opening 92, and an anchor portion 96. The anchor 84 can be disposed in the concrete of either the concrete floor or foundation 20, or the concrete wall 204 (FIG. 9). The opening 92 advantageously can be positioned flush with the upper surface 26, or the outer surface 208 (FIG. 9). Thus, the anchor 84 does not protrude from the surface to cause interference or injury. A portion of the wall 14 or floor 200 (FIG. 9), such as the sill plate 30 or rim joist 212 (FIG. 9) can be disposed against the surface 26 or 208 (FIG. 9), and against the anchor 84. The fastener 60 can be inserted through the portion of the wall or floor and into the anchor bore 88 of the anchor 84 to secure the wall 14 to the floor 20, or the floor 200 (FIG. 9) to the wall 204 (FIG. 9).

It is to be understood that the above-described arrangements are only illustrative of the application for the principles of the present invention. Numerous modifications and alternative arrangements may be devised by those skilled in the art without departing from the spirit and scope of the present invention and the appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. An attachment system configured to attach a wall system to a floor with an upper surface, the attachment system comprising:
   a) an elongated strap, configured to be attached to, and between, the wall system and the floor, including:
      1) a base portion, configured to be attached flush with the upper surface of the floor;
      2) an attachment portion, pivotally coupled to the base portion, configured to be attached to the wall system;
      3) a hinge portion, coupled between the base and attachment portions, with a pivot axis about which the attachment portion is pivotal with respect to the base portion; and
      4) the attachment portion being pivotal about the pivot axis with respect to the base portion to a pivoted configuration in which the attachment portion is disposed over the base portion, configured to receive a portion of the wall system therebetween; and
   b) a fastener, insertable through the attachment portion, the base portion, and the portion of the wall system therebetween, to secure the wall system to the floor;
   c) the base portion having an attachment hole, and the attachment portion having an alignment hole; wherein the alignment hole and the attachment hole are aligned in the pivoted configuration; and wherein the fastener is insertable through the attachment hole and the alignment hole in the pivoted configuration.

2. An attachment system configured to attach a wall system to a floor with an upper surface, die attachment system comprising:
   a) an elongated strap, configured to be attached to, and between, the wall system and the floor, including:
      1) a base portion, configured to be attached flush with the upper surface of the floor;
      2) an attachment portion, pivotally coupled to the base portion, configured to be attached to the wall system;
      3) a hinge portion, coupled between the base and attachment portions, with a pivot axis about which the attachment portion is pivotal with respect to the base portion; and
      4) the attachment portion being pivotal about the pivot axis wit respect to the base portion to a pivoted configuration in which the attachment portion is disposed over the base portion, configured to receive a portion of the wall system therebetween; and
   b) a fastener, insertable through the attachment portion, the base portion, and the portion of the wall system therebetween, to accure the wall system to the floor;
      1) the floor being formed of concrete; and
   c) a concrete anchor, attached to the strap, configured to be received within the concrete of the floor, having an anchor bore therein to securely receive the fastener, and having an anchor portion extending there from to resist removal of the concrete anchor from the floor.

3. An attachment system in accordance with claim 2, wherein the anchor bore has screw threads formed therein; and wherein the fastener has screw threads formed thereon engagable with the screw threads in the anchor bore to secure the fastener to the concrete anchor.

4. An attachment system configured to attach a wall system to a concrete floor with an upper surface, the attachment system comprising:
　a) a concrete anchor, configured to be substantially entirely disposed in the concrete floor before concrete of the concrete floor is cured, and including:
　　1) an anchor bore having an opening thereto configured to be located substantially flush with the upper surface of the concrete floor, and a longitudinal axis.
　　2) an anchor portion having at least a portion extending laterally with respect to the longitudinal axis to anchor in the concrete and resist removal of the concrete anchor;
　b) a strap, attached to the concrete anchor, and configured to be disposed flush with the concrete floor, and including:
　　1) a base portion, configured to be attached flush with the upper surface of the concrete floor;
　　2) an attachment portion, pivotally coupled to the base portion, configured to be attached to the wall system;
　　3) a hinge portion, coupled between the base and attachment portions, with a pivot axis about which the attachment portion is pivotal with respect to the base portion; and
　　4) the attachment portion being pivotal about the pivot axis with respect to the base portion to a pivoted configuration in which te attachment portion is disposed over the base potion, configured to receive a portion of the wall system therebetween; and
　c) a fastener, insertable through the attachment portion and the base portion of the strap, and configured to extend through the portion of the wall system therebetween, to secure the wall system to the concrete floor.

5. An attachment system in accordance with claim 4, wherein the base portion of the strap has an attachment hole, and the attachment portion of the strap has an alignment hole; wherein the alignment hole and the attachment hole align in the pivoted configuration; and wherein the fastener is insertable through the attachment hole and alignment hole in the pivoted configuration.

6. An attachment system in accordance with claim 4, further comprising:
　a) positioning indicia, formed on the strap, to properly align the strap with the concrete floor.

7. A wall and floor connector for two workpieces, the configuration of the connector under going alteration from generally flat configuration adapted to be initially contiguous with only one surface of each workpiece, to a circuitous configuration contiguous with one surface of one workpiece and a plurality of surfaces of the second workpiece, the connector comprising:
　a one-piece blank comprising:
　　a first segment comprising a first flat surface adapted to be initially placed contiguous with one surface of the first workpiece:
　　a second segment conprising two flat surfaces and two transversely disposed fold lines across the blank adapted to being crimped along one fold line to become contiguous with a second surface of the second workpiece and crimped along the second fold line to become contiguous with a third surface of the second workpiece;
　　a third segment of the blank joined to the first segment remote from the second segment accommodating wrapping of the third segment into an angular relationship with the first segment and into a contiguous relationship with a fourth surface of the second workpiece;
　　apertures in the blank, which apertures become aligned when the blank is crimped to collectively receive a fastener non-rotably joining the two workpieces.

8. A connector according to claim 7 wherein at least one fold line is weakened.

9. A connector according to claim 8 wherein the at least one weakened fold line comprises spaced aligned perforations.

10. A wall and floor connector for two workpieces, the configuration of the connector undergoing alteration from generally flat configuration adapted to be initially contiguous with only one surface of each workpiece, to a circuitous configuration contiguous with one surface of one workpiece and a plurality of surfaces of the second workpiece, the connector comprising:
　a one-piece blank comprising:
　　a first segment comprising a first flat surface adapted to be initially placed contiguous with one surface of the first workpiece;
　　a second segment coprising two flat surfaces and two transversely disposed fold lines across the blank adapted to being crimped along one fold line to become contiguous with a second surface of the second workpiece and crimped along the second fold line to become contiguous with a third surface of the second workpiece;
　　apertures in the blank, which apertures become aligned when the blank is crimped to collectively receive a fastener non-ratably joining the two workpieces;
　　the first and second segments comprising apertures adopted to be aligned with an aperture in the second workplace to receive a fastener to non-displaceably secure the connector and the second workpiece to the first workpiece.

11. A wall and floor connector for two workpieces, the configuration of the connector undergoing alteration from generally flat configuration adapted to be initially contiguous with only one surface of each workpiece, to a circuitous configuration contiguous with one surface of one workpiece and a plurality of surfaces of the second workpiece, the connector comprising:
　a one piece blank comprising:
　　a first segment comprising a first flat surface adapted to he initially placed contiguous with one surface of the first workpiece:
　　a second segment comprising two flat surfaces and two transversely disposed fold lines across the blank adapted to being crimped along one fold line to become contiguous with a second surface of the second workpiece and crimped along the second fold line to become contiguous with a third surface of the second workpiece:
　　apertures in the blank, which apertures become aligned when the blank is crimped to collectively receive a fastener non-rotably joining the two workpieces:
　　the connector further comprising apertures for receipt of fasteners to separately secure the connector to the workpieces in the assembled condition.

12. A wall and floor connector for two workpieces, the configuration of the connector undergoing alteration from generally flat configuration adapted to be initially contiguous with only one surface of each workpiece, to a circuitous configuration contiguous with one surface of one workpiece and a plurality of surfaces of the second workpiece, the connector comprising:
  a one-piece blank comprising:
    a first segment comprising a first flat surface adapted to be initially placed contiguous with one surface of the first workpiece;
    a second segment comprising two flat surfaces and two transversely disposed fold lines across the blank adapted to being crimped along one fold line to become contiguous with a second surface of the second workpiece and crimped along the second fold line to become contiguous with a third surface of the second workpiece;
    apertures in the blank, which apertures become aligned when the blank is crimped to collectively receive a fastener non-rotably joining the two workpieces;
    at least one cleat for engagement with at least one workpiece.

13. A wall and floor connector for two workpieces, the configuration of the connector undergoing alteration from generally flat configuration adapted to be initially contiguous with only one surface of each workpiece, to a circuitous configuration contiguous with one surface of one workpiece and a plurality of surfaces of the second workpiece, the connector comprising:
  a one-piece blank comprising:
    a first segment comprising a first flat surface adapted to be initially placed contiguous with one surface of the first workpiece;
    a second segment comprising two flat surfaces and two transversely disposed fold lines across the blank adapted to being crimped along one fold line to become contiguous with a second surface of the second workpiece and crimped alone the second fold line to become contiguous with a third surface of the second workpiece;
    apertures in the blank, which apertures become aligned when the blank is crimped to collectively receive a fastener non-rotably joining the two workpieces;
    the connector comprising a metal strap.

14. A combination comprising a thin one-piece floor-to-wall and wall-to-floor connector, the combination comprising:
  a first workpiece;
  a second workpiece;
  the connector a being circuitously deformed to contiguously engage one surface of the first workpiece and at least three surfaces of the second workpiece;
  a fastener extending through the second workpiece and the connector, at two spaced locations into a connected non-rotatable relationship in the first workpiece;
  the second workpiece comprising a rectangular cross sectional configuration comprising corners and the connector comprising metal deformed to form at least corners aligned with corners of the second workpiece.

15. A combination coprising a thin one-piece floor-to-wall and wall-to-floor connector, the combination comprising:
  a first workpiece;
  a second workpiece;
  the connector being circuitously deformed to contiguously engage one surface of the first workpiece and at least three surfaces of the second workpiece;
  a fastener extending through the second workpiece and the connector, at two spaced locations into a connected non-rotatable relationship in the first workpiece;
  one workpiece being formed of wood.

16. A combination comprising a thin one-piece floor-to-wall and wall-to-floor connector, the combination comprising:
  a first workpiece;
  a second workpiece;
  the connector being circuitously deformed to contiguously engage one surface of the first workpiece and at least three surfaces of the second workpiece;
  a fastener extending through the second workpiece and the connector, at two spaced locations into a connected non-rotatable relationship in the first workpiece;
  the first workpiece being formed of concrete.

17. A combination according to claim 16 wherein the fastener comprises male threads and wherein the first workpiece comprises an anchor comprising a threaded female receptacle embedded in the concrete, the receptacle comprising an end flush to the one surface of the first workpiece whereby the threads of the fastener and the threads of the female receptacle are tightly engaged.

18. A combination according to claim 17 wherein the anchor further comprises a tail non-aligned with the receptacle and embedded in the concrete.

19. A combination comprising a thin one-piece floor-to-wall and wall-to-floor connector, the combination comprising:
  a first workpiece;
  a second workpiece;
  the connector being circuitously deformed to continuously engage one surface of the first workpiece and at least three surfaces of the second workpiece;
  a fastener extending through the second workpiece and the connector, at two spaced locations into a connected non-rotatable relationship in the first workpiece;
  the connector engaging four surfaces of the second workpiece.

20. A combination comprising a thin one-piece floor-to-wall and wall-to-floor connector, the combination comprising:
  a first workpiece;
  a second workpiece;
  the connector being circuitously deformed to contiguously engage one surface of the first workpiece and at least three surfaces of the second workpiece;
  a fastener extending through the second workpiece and the connector, at two spaced locations into a connected non-rotatable relationship in the first workpiece;
  the connector comprising bent corners.

21. A combination according to claim 20 wherein the corners comprise weakened locations accommodating bending of the connector transverse to its length to form the corners.

22. A combination according to claim 21 wherein the weakened locations comprise aligned perforations.

23. A combination comprising a thin one-niece floor-to-wall and wall-to-floor connector, the combination comprising:
  a first workpiece;
  a second workpiece;
  the connector being circuitously deformed to contiguously engage one surface of the first workpiece and at least three surfaces of the second workpiece;

a fastener extending through the second workpiece and the connector, at two spaced locations into a connected non-rotatable relationship in the first workpiece;

the connector further comprising apertures for the passage therethrough into one of the workpieces of additional fasteners.

24. A combination comprising a thin one-piece floor-to-wall and wall-to-floor connector, the combination comprising:

a first workpiece;

a second workpiece;

the connector being circuitously deformed to contiguously engage one surface of the first workpiece and at least three surfaces of the second workpiece;

a fastener extending through the second workpiece and the connector, at two spaced locations into a connected non-rotatable relationship in the first workpiece;

the connector further comprising at least one cleat for engagement with one of the workpieces.

25. A combination comprising thin one-piece floor-to-wall and wall-to-floor connector, the combination comprising:

a first workpiece;

a second workpiece;

the connector being circuitously deformed to contiguously engage one surface of the first workpiece and at least three surfaces of the second workpiece;

a fastener extending through the second workpiece and the connector, at two spaced locations into a connected non-rotatable relationship in the first workpiece;

the connector comprising a thin one-piece metal strap.

26. A method of connecting walls to floors and floors to walls using rotation, comprising the acts of:

deforming a one piece thin connector at at least two fold lines contiguously around at least three sides of one workpiece creating at least three angularly related connector segments;

bringing one connector segment into contiguous relation with another workpiece;

placing a fastener through the connector and the one workpiece and securing the fastener at the other workpiece to unite the one workpiece-connector-other workpiece relationship against collective or independent displacement.

27. A flat connector contiguously wrapped around at least three angularly related surfaces of one workpiece and contiguous with at least one surface of another workpiece with at least one fastener securing the connector and the workpieces together against any material independent and collective displacement.

28. A flat floor/wall connector adapted to contiguously surround at least three angularly related surfaces of one workpiece and contiguously engage at least one surface of another workpiece to accommodate passage of at least one master fastener through the connector and the one workpiece and secure connection to the other workpiece to hold the connector and the workpieces in unitary relation against any material independent and collective displacement.

29. A flat floor/wall connector according to claim 28 wherein both workpieces comprise wood.

* * * * *